US009559888B2

(12) United States Patent
Wang et al.

(10) Patent No.: US 9,559,888 B2
(45) Date of Patent: Jan. 31, 2017

(54) VOIP CLIENT CONTROL VIA IN-BAND VIDEO SIGNALLING

(71) Applicant: Alcatel Lucent, Boulogne Billancourt (FR)

(72) Inventors: Daping Wang, Melbourne (AU); Martin Dermot Whelan, Melbourne (AU)

(73) Assignee: Alcatel Lucent, Boulogne-Billancourt (FR)

( * ) Notice: Subject to any disclaimer, the term of this patent is extended or adjusted under 35 U.S.C. 154(b) by 154 days.

(21) Appl. No.: 14/374,391

(22) PCT Filed: Jan. 24, 2013

(86) PCT No.: PCT/EP2013/051382
§ 371 (c)(1),
(2) Date: Jul. 24, 2014

(87) PCT Pub. No.: WO2013/110732
PCT Pub. Date: Aug. 1, 2013

(65) Prior Publication Data

US 2015/0036678 A1 Feb. 5, 2015

(30) Foreign Application Priority Data

Jan. 25, 2012 (EP) .................................... 12290030

(51) Int. Cl.
*H04L 29/06* (2006.01)
*H04W 76/02* (2009.01)
(Continued)

(52) U.S. Cl.
CPC ..... *H04L 29/06476* (2013.01); *H04L 65/1069* (2013.01); *H04M 3/02* (2013.01);
(Continued)

(58) Field of Classification Search
CPC .. H04W 72/1205; H04W 76/00; H04W 76/02; H04W 76/022; H04W 76/025; H04L 29/08576; H04L 29/06476
See application file for complete search history.

(56) References Cited

U.S. PATENT DOCUMENTS

2002/0024539 A1* 2/2002 Eleftheriadis ......... G06F 9/4443 715/765
2006/0282774 A1 12/2006 Covell et al.
(Continued)

FOREIGN PATENT DOCUMENTS

WO WO 2008/080421 A1 7/2008
WO WO 2009/114482 A1 9/2009

OTHER PUBLICATIONS

Herpel C. et al.,"MPEG-4 Systems: Elementary stream management," Signal Processing, Image Communication, Elsevier Science Publishers, vol. 15, No. 4-5, pp. 299-320, XP027357193, Jan. 1, 2000.

(Continued)

*Primary Examiner* — Ashley Shivers
(74) *Attorney, Agent, or Firm* — Fay Sharpe, LLP

(57) ABSTRACT

The present document relates to telecommunication networks. In particular, the present document relates to the provision of network interaction services within a telecommunication network. A method for enabling interaction services with a network comprising a network server (102, 103, 104) on communication devices (101, 105) coupled to the network is described. The method comprises setting up (301, 302) a multimedia communication session between a first communication device (101) and a second communication device (105) via the network server (102, 103, 104); wherein the multimedia communication session comprises a data bearer channel; transmitting (303) an interactive visual object via the data bearer channel from the network server
(Continued)

Figure 1:
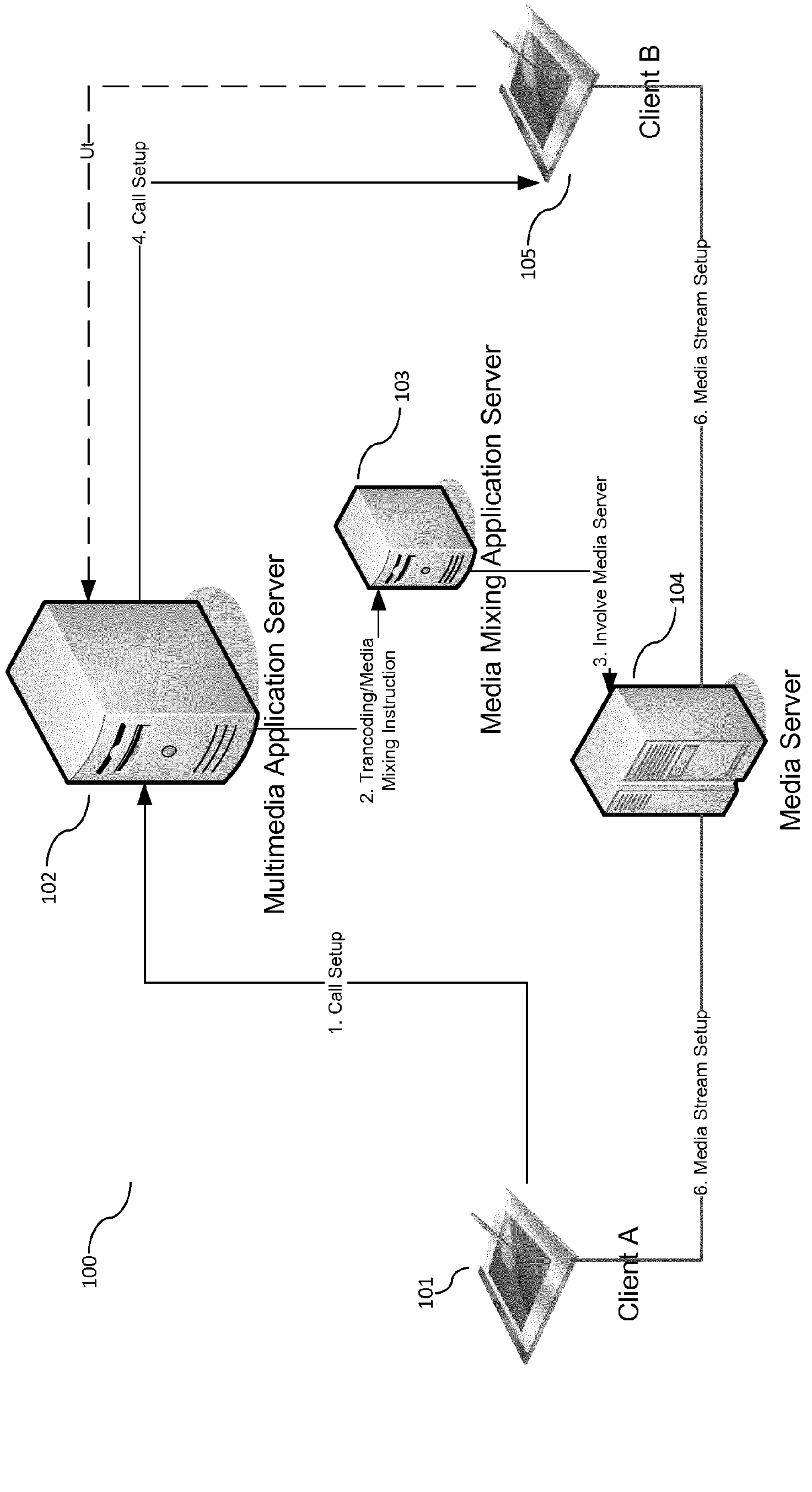

(102, 103, 104) to the first communication device (101); wherein the interactive visual object is associated with an interaction service of the first communication device (101) with the network; wherein the interactive visual object is intended for display on a display of the first communication device (101); receiving a feedback command from the first communication device (101) to the network server (102, 103, 104); wherein the feedback command is associated with an input at the first communication device (101) based on the interactive visual object; and initiating the execution of the interaction service in accordance to the feedback command.

9 Claims, 3 Drawing Sheets

(51) Int. Cl.

| | |
|---|---|
| ***H04N 21/458*** | (2011.01) |
| ***H04N 21/63*** | (2011.01) |
| ***H04N 21/81*** | (2011.01) |
| ***H04N 21/858*** | (2011.01) |
| ***H04M 3/02*** | (2006.01) |
| ***H04M 3/42*** | (2006.01) |

(52) U.S. Cl.
CPC .... *H04M 3/42042* (2013.01); *H04N 21/4586* (2013.01); *H04N 21/632* (2013.01); *H04N 21/8173* (2013.01); *H04N 21/858* (2013.01); *H04W 76/02* (2013.01)

(56) References Cited

U.S. PATENT DOCUMENTS

| | | | | |
|---|---|---|---|---|
| 2010/0154009 | A1 | 6/2010 | Del Sordo | |
| 2011/0268418 | A1 | 11/2011 | Jones et al. | |
| 2011/0271208 | A1* | 11/2011 | Jones | H04L 12/1822 715/753 |
| 2011/0307933 | A1 | 12/2011 | Gavita et al. | |

OTHER PUBLICATIONS

J. John Arthur et al., "Proposal for an MPEG-4 multi-users worlds architecture and tools," MPEG Meeting, pp. 1-33, XP030035842, Jan. 14, 2001.

"Text of ISO/IEC 14496-11," MPEG Meeting, pp. 1-513, XP030012565, May 2, 2005.

International Search Report for PCT/EP2013/051382 dated Apr. 17, 2013.

European Search Report for EP 12290030.1 datedJun. 29, 2012.

* cited by examiner

VOIP CLIENT CONTROL VIA IN-BAND VIDEO SIGNALLING

TECHNICAL FIELD

The present document relates to telecommunication networks. In particular, the present document relates to the provision of network interaction services within a telecommunication network.

BACKGROUND

With more intelligence being integrated into next generation communication end devices (e.g. mobile telephones, cordless phones), higher expectations are put on such communication end devices to handle various interactions with the network. Examples for such interactions are multi-party call features such as call transfer, call hold, conference call, etc. The provisioning of such network interaction features within a communication network typically requires a coordinated provision of appropriate interaction settings and/or interaction firmware on the communication end devices and on the application servers within the network.

A traditional approach to handling such coordinated provision of interaction settings is to rely on an end-to-end device management system. Whenever the network is deploying an interaction feature that requires different interaction settings on the communication end devices, new configuration settings are pushed to the clients (i.e. towards the communication end devices) via a standard management interface, e.g. TR-69. If the interaction feature to be deployed requires new service logic in addition to or alternatively to updated configuration settings, a firmware upgrade needs to be deployed on the communication end devices. Such a centralized device management approach not only introduces deployment lead times for new interaction services and features that jeopardize the agility of next generation application deployment, but is also prone to errors. Furthermore, the great number of different types of communication end devices requires the provision of a large number of different configuration settings and firmware upgrades for the different types of communication end devices. Overall, a centralized device management approach requires significant financial and time efforts, in particular to validate multiple handsets/clients within a given network infrastructure.

The use of Javascript/HTML5-based web clients on the communication end devices makes the upgrade of the communication devices to new configuration settings easier, but it is almost impossible for operators to make sure that the same user experience can be guaranteed across all clients.

The present document addresses the above mentioned shortcomings of traditional schemes for providing new network interaction features and services. The described methods and systems enable a fast and homogeneous implementation of network interaction services on various different types of communication end devices.

SUMMARY

According to an aspect a method for enabling interaction services with a network comprising a network server on communication devices coupled to the network is described. Interaction services may be services which allow a communication device to trigger communication related features or services within the network. Examples for such interaction services are multi-party call features such as the call transfer, call hold and conference call features. Further examples for interaction services are prompt and collect features as used e.g. in call centers, in order to direct a calling party to an appropriate assistant. More generally, the interaction service may be communication services (comprising e.g. a call, i.e. voice, component, and/or a video component). Examples for such communication services are Communication Transfer, Communication Waiting, Communication Hold, Prompt and Collect, Communication Reminder, Communication Forwarding Notification, Communication Park/Pick-up, Communication Retrieval, Communication Diversion, Message waiting Indication, and Advice Of Charge. Typically the interaction services are triggered by at least one of the communication devices connected to the network. Subsequently, the triggered service (e.g. the conference call feature) may be executed (or established) by a network server (e.g. an application server and/or a media server) within the network.

The method comprises setting up a multimedia communication session between a first communication device and a second communication device via the network server. The setup of the communication session may be performed subject to the request of the first and/or the second communication device. By way of example, the first (or the second) communication device may request the setup of a voice communication session with the respective other communication device. Nevertheless, the multimedia communication session comprises a data (e.g. a video) bearer channel. The data bearer channel may be provided regardless the requested type of communication session. In particular, even if the setup of a voice-only communication session is requested, the method may be adapted to provide an additional data bearer channel. This additional data bearer channel may be used for the implementation of a (context-dependent) interaction service between one or more of the communication devices and the network.

The method further comprises transmitting an interactive visual object via the data bearer channel from the network server to the first communication device. The interactive visual object is associated with an interaction service of the first communication device with the network and is intended for being displayed on a display (e.g. a touch screen) of the first communication device. By way of example, the interactive visual object may be indicative of a displayable window providing one or more selectable options regarding the interaction service. The selectable options may be selected by the user of the first communication device (e.g. by touching a particular position on the display of the first communication device or by pressing a particular key on a keyboard of the first communication device). As such, the interactive visual object may comprise a visual indication on how to initiate the interaction service on the first communication device. Furthermore, the interactive visual object may be adapted to invite or prompt a user of the first communication device to provide feedback regarding the one or more selectable options available for the interaction service.

The method further comprises receiving a feedback command from the first communication device at the network server. The information comprised within the feedback command may have been captured at the first communication device subject to an input of the user of the first communication device in response to the displayed interactive visual object. By way of example, the feedback command may be indicative of the option selected by the user of the first communication device.

Furthermore, the method comprises initiating the executing of (or establishing) the interaction service in accordance to the feedback command. Typically, the execution of the interaction service is initiated and coordinated by the network server. However, in other examples, the feedback command may relate to an interaction service which is provided by the second communication device (e.g. a prompt and collect service). In such cases, the feedback command is sent to the second communication device (via the network server) and the second communication device initiates the execution of the selected option of the interaction service.

The method may further comprise the step of transmitting executable logic via the data bearer channel from the network server to the first communication device. Such executable logic may be transmitted e.g. subsequent to the initiation of the execution of the interaction service. The executable logic may be associated with the execution of the interaction server. In particular, the executable logic may comprise a software component (e.g. a Java script) of the interaction service which is intended for execution at the first communication device. As such, to the executable code may be transferred from the server to the first communication device piece by piece, as and when required by the call scenario. Hence, the structure and logic of the server side application is modified. Such transmission of executable logic may be performed, in order to keep service intelligence within the network and in order to keep the communication devices (e.g. a handset client) lightweight. This results in a loosely coupled architecture, therefore reducing dependencies between handsets and network, making the testing and maintenance shorter and simpler.

The multimedia communication session may be related to different media types. By way of example, the multimedia communication session may be related to a voice communication, such that the multimedia communication session comprises a voice bearer channel for exchanging audio data between the first and the second communication devices. Even though, the users of the first and/or second communication device may have requested a voice-only communication session, the method is adapted to provide an additional data bearer channel for transmitting an interactive visual object to the first communication device, in order to enable the implementation of network interaction services, regardless the inherent capabilities of the first communication device.

By way of example, the multimedia communication session may be based on the MPEG 4 protocol. In such cases, the data bearer channel may comprise a Binary Format for Scenes (BIFS) elementary stream. The BIFS stream may be used to describe and to transmit the interactive visual object. In the opposite direction, the feedback command may be transmitted as any one of an Anchor node or a ServerCommand node defined in the MPEG 4 standard.

The step of setting up the multimedia communication session may comprise negotiating parameters of the multimedia communication session between the first and second communication devices. Such negotiation may be performed using the Session Description Protocol (SDP). By way of example, the parameters may comprise the media type which is to be used for the multimedia communication session, e.g. the media subtype "mpeg-generic".

According to another aspect, a network server configured for enabling communication devices coupled to a network to perform interaction services with the network is described. The network server is configured to set up a multimedia communication session between a first communication device and a second communication device. Regardless, the requested type of communication session (e.g. a voice-only communication session), the set-up multimedia communication session comprises a data bearer channel. Furthermore, the network server is configured to send an interactive visual object via the data bearer channel to the first communication device. The interactive visual object is associated with an interaction service of the first communication device with the network. In addition, the interactive visual object is adapted for being displayed on a display of the first communication device. In return, the network server is configured to receive a feedback command from the first communication device. The feedback command is associated with the interactive visual object, e.g. with a selection performed by the user of the first communication device in response to the displayed interactive visual object. Furthermore, the network server is configured to initiate and/or coordinate the execution of the interaction service in accordance to the feedback command.

According to a further aspect, a software program is described. The software program may be adapted for execution on a processor and for performing the method steps outlined in the present document when carried out on a computing device.

According to another aspect, a storage medium is described. The storage medium may comprise a software program adapted for execution on a processor and for performing the method steps outlined in the present document when carried out on a computing device.

According to a further aspect, a computer program product is described. The computer program may comprise executable instructions for performing the method steps outlined in the present document when executed on a computer.

It should be noted that the methods and systems including its preferred embodiments as outlined in the present patent application may be used stand-alone or in combination with the other methods and systems disclosed in this document. Furthermore, all aspects of the methods and systems outlined in the present patent application may be arbitrarily combined. In particular, the features of the claims may be combined with one another in an arbitrary manner.

SHORT DESCRIPTION OF THE FIGURES

Figure 2:
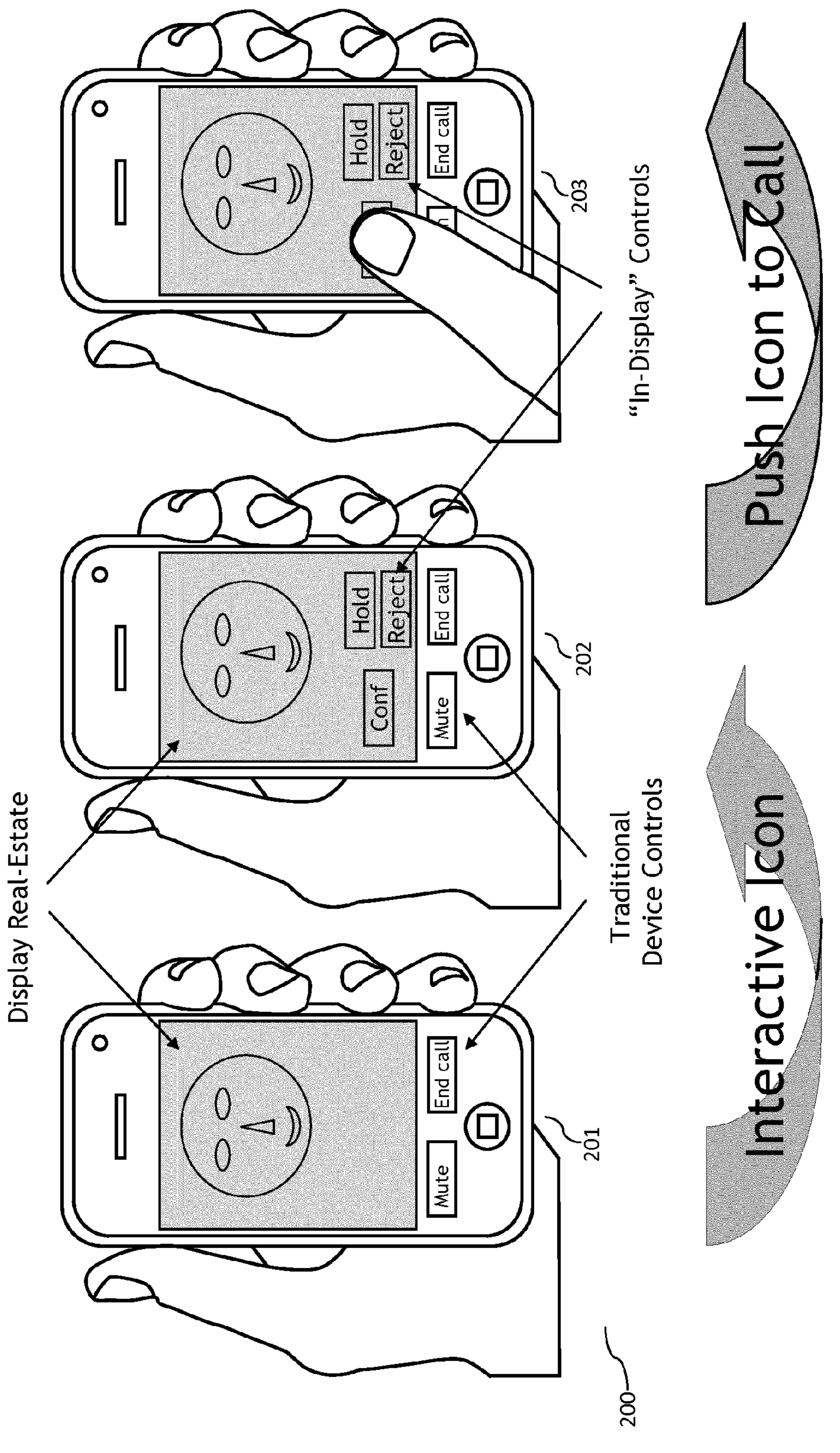
Figure 3:
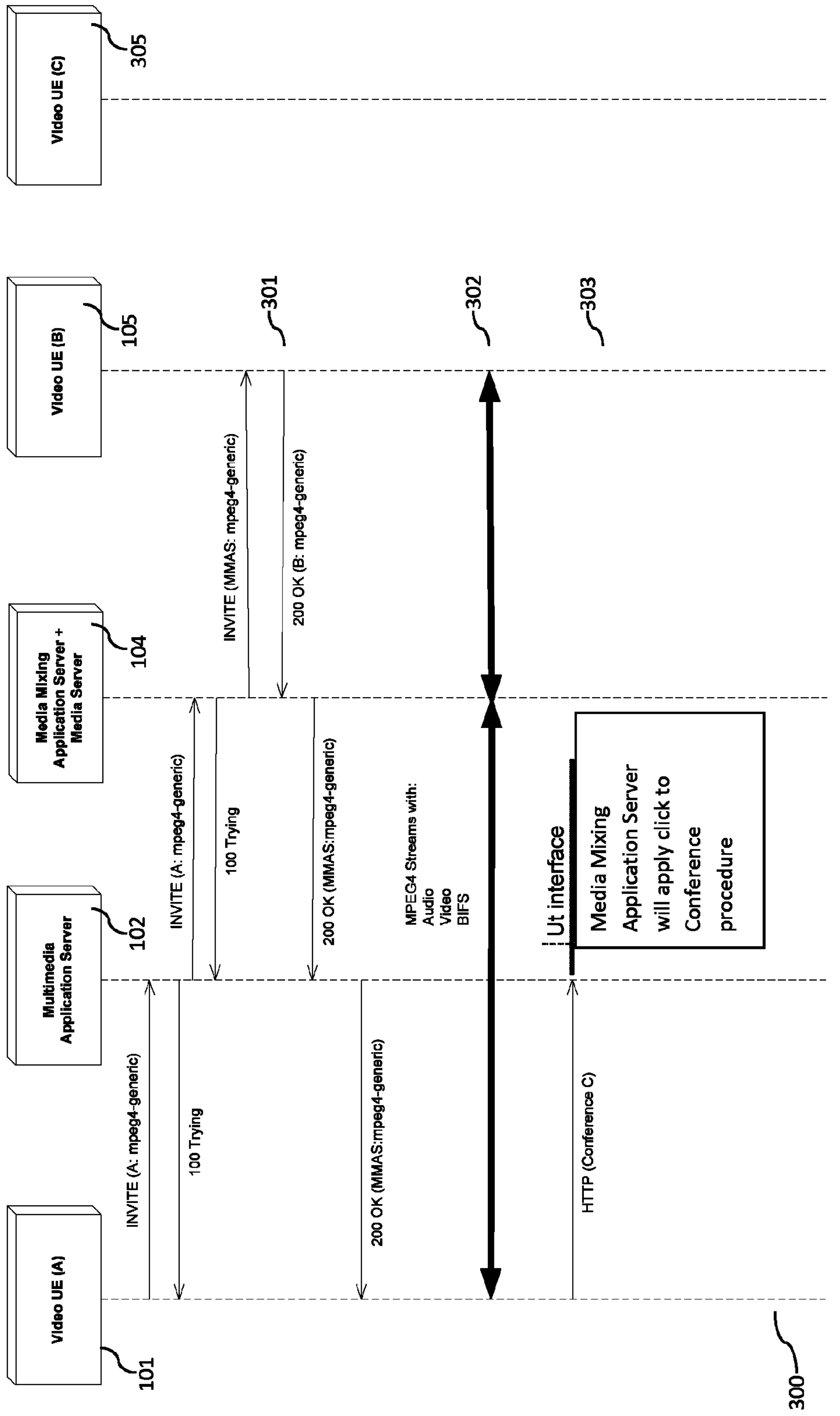

The invention is explained below in an exemplary manner with reference to the accompanying drawings, wherein FIG. 1 illustrates an example communication network comprising a plurality of communication end devices;

FIG. 2 illustrates an example client interface for enabling a network interaction feature; and FIG. 3 illustrates an example call flow for the provisioning of a network interaction feature.

DETAILED DESCRIPTION

It is to be expected that communication devices such as smartphones will support video calls for future VoIP deployments. At the same time, in view of the widely deployed fixed and mobile broadband networks, it is to be expected that any kind of call in the near future becomes a video-call (even if only voice information is being exchanged). In other words, it is to be expected that all kinds of communication will make use of a communication protocol for video communication (such as the MPEG-4 standard), regardless if the audio channel is used alone or the audio and video channels are used in combination for a particular communication. By way of example, if only the audio channel is used for a particular communication, the video channel may be used to display a network-provided avatar of the caller and/or the called party on the screens of the calling device and/or the called device.

As such, it is to be expected that future communications will be configured to provide a bearer channel for video content, even though a particular communication may not actually make use of the video bearer channel for the exchange of video data. The availability of a video bearer channel provides an opportunity for the network to combine the video content delivery with the signalling control. In particular, it is proposed in the present document to make use of the video bearer channel for the in-band signalling, i.e. the in-band provisioning, of network interaction services.

In the following, a method and system for providing control information regarding a network interaction service to a communication end device using the MPEG-4 standards is described.

It should be noted, however, that the presently described scheme for exchanging control information regarding network interaction services as in-band video information is applicable to other audio/video (AV) communication protocols.

The MPEG-4 standards specify various elementary streams (ES), such as audio and video streams. In addition, user interactivity support may be carried via an additional BIFS (Binary Format for Scenes) elementary stream. Details regarding the BIFS elementary stream are provided in ISO/IEC 14496-11:2005—Information technology—Coding of audio-visual objects—Part 11: Scene description and application engine, which is incorporated by reference. The BIFS format is a compact binary format for representing a pre-defined set of audio-visual objects, their behaviors, and their spatiotemporal relationships. The BIFS scene description may, in general, be time-varying. Consequently, BIFS data is typically carried in a dedicated elementary stream. Portions of BIFS data that become valid at a given point in time are contained in so called CommandFrames or AnimationFrames and are delivered within time-stamped access units (i.e. time-stamped frames of the BIFS elementary stream).

As such, the BIFS elementary stream allows the transmission of audio-visual control objects in addition to the video information transmitted to a communication end device. In general terms, it may be stated that the combination of the BIFS elementary stream and the video elementary stream provide a video bearer channel for the transmission of interactive video content.

Prior to exchanging communication data, the Session Description Protocol (SDP) may be used to describe the upcoming multimedia communication session and to enable a communication end device to announce an upcoming multimedia communication session and to invite another communication end device for a multimedia session. Furthermore, the SDP enables the communication end devices to negotiate appropriate parameters for an upcoming communication session. The set of parameters may be referred to as a session profile as illustrated e.g. in Table 1. Part of the session profile is the so called media subtype which describes the type of media to be exchanged.

In order to use the BIFS elementary stream, the media subtype "mpeg-generic" may be used when being carried by the RTP (Real-time Transport Protocol) flow. This generic MPEG-4 stream support runs beyond the basic MEPG-4 audio and video stream over RTP. When the "mpeg-generic" media subtype is used in the SDP (Session Description Protocol), different parameters will be used to indicate various elementary streams defined in the MPEG-4 standards. Table 1 shows an example session profile for using a BIFS elementary stream.

TABLE 1

```
m=video 49230 RTP/AVP 96
a=rtpmap:96 mpeg4-generic/1000
a=fmtp:96 streamtype=3; profile-level-id=1807; mode=generic;
objectType=2; config=0842237F24001FB400094002C0; sizeLength=10;
CTSDeltaLength=16; randomAccessIndication=1;
streamStateIndication=4
```

For clients that only support RFC 3016 or MPEG-4 audio and video streams, the extra control information carried in the BIFS elementary stream will be dropped, subsequent to SDP negotiation. The dropping of the BIFS elementary stream will not, however, impact the normal video/audio presentation carried via the separate audio and/or video elementary streams. As such, backward compatibility is ensured for communication end devices which do not support the use of interactive visual objects defined in the BIFS elementary stream.

As indicated above, the BIFS elementary stream of MPEG 4 may be used to define (two dimensional or three dimensional) audio-visual objects which are represented on the display of a communication end device. Furthermore, the BIFS elementary stream may be used to describe possible interactions with the audio-visual objects. The BIFS format is based on VRML (Virtual Reality Modelling Language). The BIFS scene description consists of a collection of nodes that describe the scene structure. An audio-visual object in the scene is described by one or more nodes, which may be grouped together (using a grouping node). Nodes are grouped into node data types (NDTs) and the exact type of the node is specified using a nodeType field. An example node for providing feedback regarding an interaction with an audio-visual object is the so called "Anchor" node.

As such, in the BIFS part of the overall MPEG-4 stream, sensors may be defined to capture mouse or touch activities performed by an end user on the display of a communication end device. Furthermore, the display of scenes may be re-arranged according to the user's input. Whenever the main visual display stream is defined in a node with touch sensor capability, user input can be captured and can be sent to the server via either the 'Anchor' node, which is originally defined in the VMRL specification (ISO/IEC 14772-1:1998, subclause 6.2, which is incorporated by reference), or via the "ServerCommand" node. Table 2 illustrates an example for sending user input information regarding a "call hold" interaction via an 'Anchor' node.

TABLE 2

```
...
<Transform2D DEF="HOLD_BUTTON">
    <children>
    <Anchor DEF="AN1" url=""http://serviceprovider.com/call-
hold"">
        <!-Calling Restful API from the service provider for call hold
handling-->
    <children>
      <Shape>
      ...
       <Text string=""HOLD""/>
      </Shape>
      </children>
      ...
```

TABLE 2-continued

```
        </Anchor>
      </children>
</Transform2D>
...
```

From a VoIP application's point of view, the use of the interactive nodes defined within an MPEG-4 stream provides the possibility of a direct HTTP-based interface between a client (i.e. a communication end device) and an application server. As an example, the initiation of the interactive network service "conference call" may be considered. In the case of the TISPAN (Telecoms & Internet converged Services & Protocols for Advanced Networks), ETSI, loosely coupled model, when a client wants to initiate a conference call, the client has to initiate an INVITE command with the pre-defined conference SIP (Session Initiation Protocol) URI (Uniform Resource Identifier) in order to trigger a media server within the network to allocate appropriate resources. This means that in order to be able to perform a conference call, the client has to be able to generate an INVITE command comprising the pre-defined SIP-URI. In other words, for every network interaction feature (such as a conference call), a client has to be provided in advance with the appropriate configuration settings and/or the appropriate firmware. As indicated above, this leads to long lead times and to high deployment efforts for the rollout of new network interaction services.

On the other hand, when the conference call control is carried in the MPEG-4 BIFS elementary stream, an overlay display of a conference call button can be provided by the network (e.g. by a communication server within the network) to the client as an interactive audio-visual object. Such an overlay display can be provided to the client as in-band bearer information and does not require any modification of the configuration settings and/or the firmware of the client. The overlay display may be defined as an interactive audio-visual object which captures a feedback of the user of the client (e.g. the user touching the screen at a particular position or the user actuating a particular key). When the feedback is captured, a HTTP message (see e.g. Table 2) is sent from the client to the communication server within the network, in order to trigger a 'click-to-conference' logic and to thereby enable the conference call. Consequently, there is no need for the client to be pre-configured with a particular conference call SIP URI. In a similar manner, other network interaction services (e.g. other multi-party call features like call hold, call transfer, etc.) can be implemented by using the transmission of interactive visual objects within the video bearer channel.

FIG. 1 illustrates an example high level network architecture 100 for implementing the above described in-band video signalling. A client A 101 initiates a call setup towards a multimedia application server 102. The application server 102 selects an appropriate media server 104 for the requested call. Furthermore, the application server 102 may involve a media mixing application server 103 if transcoding and/or media mixing is required for the requested call. In addition, the application server 102 forwards the call setup to the client B 105 and establishes a media stream (i.e. a bearer channel) between client A 101 and client B 105 via the media server 104.

As outlined above, it is assumed that the established communication between client A 101 and client B 105 is a multimedia communication (e.g. using the MPEG 4 protocol), regardless the type of requested communication. By way of example, if client A 101 requests the setup of a voice communication, the voice communication is setup using a voice elementary stream of MPEG 4. This voice elementary stream of MPEG 4 can be complemented by video information (e.g. to transmit a pre-recorded picture of the called party from the media server 104 to the client A 101). Furthermore, the voice elementary stream may be complemented to provide interactive video objects (e.g. using a BIFS elementary stream), thereby enabling additional network interaction services (e.g. multi-party call features) to client A 101 and/or client B 105, regardless the configuration settings and the firmware status of the clients 101, 105.

This is illustrated by the example user interface 200 shown in FIG. 2. While being in an ongoing communication, client A 101 receives a conversation request from another client (reference numeral 201). Regardless the network interaction services (e.g. multi-party call features) which are supported by the client 101, the media server 104 may transmit an interactive visual object via an elementary stream of MPEG 4 to the client 101, thereby providing the client 101 with various options on how to handle the additional conversation request (reference numeral 202). In the illustrated example, the interactive visual object (referred to as in-display controls) provides a "call hold" option for holding the ongoing communication in order to accept the conversation request, a "reject" option for rejecting the conversation request and a "conference call" option for establishing a conference call between client B 105 (of the ongoing communication), the client of the additional conversation request and client A 101. The user of client A 101 may press one of the buttons provided on the interactive visual object (reference numeral 203). The information regarding the pressed button (i.e. regarding the selected option) is sent to the media server 104 which can then initiate the appropriate actions. In the illustrated example, the user selects the "conference call" option, such that the media server 104 (or the associated application server 102) can initiate the setup of a conference call between client A 101, client B 105 and the client of the additional conversation request.

FIG. 3 illustrates an example call flow diagram for the setup of a multimedia communication which enables the in-band video signalling of supplementary network interaction services (e.g. supplementary multi-party call features). As outlined above, client 101 sets up a multimedia communication session (e.g. an MPEG 4 communication session) with client 105 via the application server 102 and the media server 104 (reference numeral 301). As a result, a multimedia communication session is established which allows the exchange of video and BIFS elementary streams (in addition to the requested audio elementary stream) (reference numeral 302). The media server 104 (or the application server 102) may make use of the video/BIFS elementary streams to provide interactive visual objects to the clients 101, 105, in order to provide the clients 101, 105 with additional network interaction services (e.g. multi-party call features), which may not necessarily be inherently supported by the clients 101, 105. Any user feedback subject to the interactive visual objects may be transmitted to the application server 102/media server 104 (e.g. as an HTTP message), thereby triggering the network to execute a selected network interaction service (reference numeral 303), e.g. to setup a conference call with the client 305.

Some of the benefits of the above described approach for the provisioning of new network interaction services are that the client behaviour may be implemented in a consistent manner across multiple communication devices and networks, hence resulting in a consistent and enhanced end user experience.

Additionally, as some of the client's behavioural logic is communicated in-band via the (video) content stream, the provisioning of content specific logic or controls to the end users is enabled. By way of example, a second communication device 105 may be enabled to provide interactive visual objects to a first communication device 101, in order to collect feedback from the user of the first communication device 101. By way of example, a first client 101 may setup a call with a second client 105 which comprises a prompt and collect function, e.g. in order to direct a user of the first client 101 to an appropriate assistant within a call centre. Instead of providing an acoustic prompt to the first client 101 and instead of waiting for an appropriate input (e.g. selected digits) from the user of the first client 101, the network or the second client 105 can update the video stream with a display comprising an interactive visual object that the user of the first client 101 should react on. The interactive display can be a dialing pad or words on a display. The user of the first client 101 can provide the appropriate feedback, thereby initiating a corresponding reaction of the network and/or of the second client 105. As such, whenever a prompt is announced, the caller (first client 101) can see clearly on the screen which button leads to where. Hence, queuing update and commercial holding media may be video based. Furthermore, translation aspects may be easier, as used e.g. in the context of phone banking. Instead of announcing card numbers, the card number can be typed on the visual prompt and checked on the screen before committing it. This will typically make users feel more comfortable and yields in a more succinct, ergonomic user interaction.

The design of the interactive visual objects can mimic the design of a web page, where the user can move his mouse or fingers around the page, select additional information and navigate to other pages. In the context of a video call, the content of the interactive visual objects can be made context sensitive, and by using a mouse or fingers, the user can be provided with real-time controls that are relevant to the part of the content being displayed.

Having the BIFS elementary stream carried in a different SDP media type also gives the application server 102 the capability to push further scene description and animation effects during a conversation. When using BIFS-ready clients 101, 105, a real time two-way communication can be manipulated to include $3^{rd}$ party streams, e.g. a web-based media content or informative text display. As such, a session re-invite from the network may move away from the traditional audio-upgrade-to-video scenario. Hence, the visual display may be further enhanced by adding various kinds of animation.

It may be expected that a certain number of real time communication clients in the future will be based on web technologies, e.g. RTC-Web or HTML5. Nevertheless, it is difficult to control all aspects of client interactions using such web technologies. Different UI (User Interface) implementation may result in different user experiences. At the same time, it is hardly possible to standardize all feature interactions in order to keep up with the fast evolving web technologies. The proposed in-band signalling scheme for the provision of interactive visual objects for network interaction services enables a service provider to control the service delivery, with a consistent service look and feel across all clients.

As a further benefit, the device management is simplified when the feature interaction logic is controlled and delivered in-band by the network. As a consequence, the end devices require less frequent configuration and firmware upgrades.

Overall, the proposed scheme for providing network interaction service as in-band signalled video content enables a service provider to roll out new interaction services in a consistent and efficient manner.

It should be noted that the description and drawings merely illustrate the principles of the to proposed methods and systems. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the proposed methods and systems and the concepts contributed by the inventors to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

Furthermore, it should be noted that steps of various above-described methods and components of described systems can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

In addition, it should be noted that the functions of the various elements described in the present patent document may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included.

Finally, it should be noted that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

The invention claimed is:

1. A method for enabling interaction services with a network comprising a network server on communication devices coupled to the network, the method comprising:

receiving a request for setup of a voice-only communication session with a second communication device by a first communication device, or vice versa;

setting up a multimedia communication session between the first communication device and a second communication device via the network server in response to the request for setup of the voice-only communication session; wherein the multimedia communication session comprises a voice bearer channel for exchanging audio data between the first and second communication devices and a video bearer channel; wherein the multimedia communication session is based on the MPEG 4 protocol;

transmitting an interactive visual object via the video bearer channel from the network server to the first communication device; wherein the interactive visual object is associated with an interaction service of the first communication device with the network and is formatted according to the Binary Format for Scenes, referred to as BIFS, format; wherein the interactive visual object is for display on a display of the first communication device; wherein the video bearer channel comprises a BIFS elementary stream;

receiving a feedback command from the first communication device to the network server; wherein the feedback command is associated with an input at the first communication device based on the interactive visual object; and executing the interaction service in accordance to the feedback command.

2. The method of claim 1, wherein the method further comprises:

transmitting executable logic via the data bearer channel from the network server to the first communication device; wherein the executable logic is associated with the execution of the interaction server and intended for execution at the first communication device.

3. The method of claim 1, wherein the feedback command is transmitted, as any one of: an Anchor node and a ServerCommand node.

4. The method of claim 1, wherein the interactive visual object comprises a visual indication on how to initiate the interaction service on the first communication device.

5. The method of claim 1, wherein setting up the multimedia communication session comprises negotiating parameters of the multimedia communication session between the first and second communication devices; and the parameters comprise a media type to be used for the multimedia communication session.

6. The method of claim 1, further comprising receiving the interactive visual object from the second communication device; wherein the interactive service is associated with a plurality of service options at the second communication device.

7. The method of claim 1, wherein the feedback command is any one of more of: a key actuation on a keyboard of the first communication device and a touch at a particular location on the display of the first communication device.

8. A non-transient storage medium carrying instructions adapted for execution on a processor and for performing the method of claim 1 when carried out on a computing device.

9. A network server adapted for enabling communication devices coupled to a network to perform interaction services with the network, the network server comprising:

at least one processor and a memory device configured to:

receive a request for a setup of a voice-only communication session with a second communication device from a first communication device, or vice versa;

set up a multimedia communication session between the first communication device and the second communication device in response to the request for setup of the voice-only communication session; wherein the multimedia communication session comprises a voice bearer channel for exchanging audio data between the first and second communication devices and a video bearer channel; wherein the multimedia communication session is based on the MPEG 4 protocol;

transmit an interactive visual object via the video bearer channel to the first communication device; wherein the interactive visual object is associated with an interaction service of the first communication device with the network and formatted according to the Binary Format for Scenes, referred to as BIFS, format; wherein the interactive visual object is for display on a display of the first communication device; wherein the video bearer channel comprises a BIFS elementary stream;

receive a feedback command from the first communication device; wherein the feedback command is associated with the interactive visual object; and execute the interaction service in accordance to the feedback command.

* * * * *